US012073575B2

(12) United States Patent
Qi et al.

(10) Patent No.: US 12,073,575 B2
(45) Date of Patent: Aug. 27, 2024

(54) OBJECT-CENTRIC THREE-DIMENSIONAL AUTO LABELING OF POINT CLOUD DATA

(71) Applicant: Waymo LLC, Mountain View, CA (US)

(72) Inventors: Ruizhongtai Qi, Mountain View, CA (US); Yin Zhou, San Jose, CA (US); Dragomir Anguelov, San Francisco, CA (US); Pei Sun, Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 448 days.

(21) Appl. No.: 17/407,795

(22) Filed: Aug. 20, 2021

(65) Prior Publication Data
US 2022/0058818 A1 Feb. 24, 2022

Related U.S. Application Data

(60) Provisional application No. 63/114,461, filed on Nov. 16, 2020, provisional application No. 63/068,966, filed on Aug. 21, 2020.

(51) Int. Cl.
*G06T 7/521* (2017.01)
*G06T 7/20* (2017.01)

(52) U.S. Cl.
CPC ............... *G06T 7/521* (2017.01); *G06T 7/20* (2013.01); *G06T 2207/10028* (2013.01); *G06T 2207/20084* (2013.01)

(58) Field of Classification Search
CPC . G06T 7/521; G06T 7/20; G06T 2207/10028; G06T 2207/20084
See application file for complete search history.

(56) References Cited

U.S. PATENT DOCUMENTS 9,630,619 B1    4/2017  Kentley et al.
10,839,530 B1 * 11/2020  Berger ................... G06N 20/00
(Continued)

OTHER PUBLICATIONS

International Search Report and Written Opinion in International Appln. No. PCT/US2021/046960, dated Feb. 16, 2023, 9 pages.
(Continued)

*Primary Examiner* — Gregory M Desire
(74) *Attorney, Agent, or Firm* — Fish & Richardson P.C.

(57) ABSTRACT

Methods, computer systems, and apparatus, including computer programs encoded on computer storage media, for performing three-dimensional auto-labeling on sensor data. The system obtains a sensor data segment that includes a temporal sequence of three-dimensional point clouds generated from sensor readings of an environment by one or more sensors. The system identifies, from the sensor data segment, (i) a plurality of object tracks that each corresponds to a different object in the environment and (ii) for each object track, respective initial three-dimensional regions in each of one or more of the point clouds in which the corresponding object appears. The system generates, for each object track, extracted object track data that includes at least the points in the respective initial three-dimensional regions for the object track. The system further generates, for each object track and from the extracted object track data for the object track, an auto labeling output that defines respective refined three-dimensional regions in each of the one or more point clouds.

17 Claims, 4 Drawing Sheets

(56) References Cited

U.S. PATENT DOCUMENTS

| | | | | |
|---|---|---|---|---|
| 10,846,511 | B2* | 11/2020 | Ozkucur | G06F 18/22 |
| 11,010,907 | B1* | 5/2021 | Bagwell | G06V 20/56 |
| 11,462,030 | B2* | 10/2022 | Ram | G06T 7/50 |
| 11,468,582 | B2* | 10/2022 | Yoo | G06V 10/764 |
| 11,585,923 | B2* | 2/2023 | Taalimi | G01S 17/06 |

OTHER PUBLICATIONS

International Search Report and Written Opinion in International Appln. No. PCT/US2021/046960, dated Nov. 22, 2021, 16 pages.

Jozsa et al., "Towards 4D Virtual City Reconstruction From Lidar Point Cloud Sequences," ISPRS Annals of the Photogrammetry, Remote Sensing and Spatial Information Sciences, May 2013, II-3/W1:15-20.

Shi et al., "From Points to Parts: 3D Object Detection from Point Cloud with Part-aware and Part-aggregation Network," IEEE Transactions on Pattern Analysis and Machine Intelligence, Feb. 2020, 43(8):2647-2664.

Wang et al., "PointTrackNet: An End-to-End Network for 3-D Object Detection and Tracking From Point Clouds," IEEE Robotics and Automation Letters, Apr. 2020, 5(2):3206-3212.

Acuna et al., "Efficient interactive annotation of segmentation datasets with polygon-RNN++," Proceedings of the IEEE conference on Computer Vision and Pattern Recognition, 2018, pp. 859-868.

Behley et al., "Semantickitti: A dataset for semantic scene understanding of lidar sequences," Proceedings of the IEEE/CVF International Conference on Computer Vision, 2019, pp. 9297-9307.

Bewley et al., "Range conditioned dilated convolutions for scale invariant 3d object detection," CoRR, Jan. 2021, arxiv.org/abs/2005.09927, 16 pages.

Cai et al., "Cascade r-cnn: Delving into high quality object detection," Proceedings of the IEEE Conference on Computer Vision and Pattern Recognition (CVPR), 2018, pp. 6154-6162.

Castrejon et al., "Annotating object instances with a polygon-RNN," Proceedings of the IEEE conference on computer vision and pattern recognition, 2017, pp. 5230-5238.

Chen et al., "Fast point r-cnn," Proceedings of the IEEE/CVF International Conference on Computer Vision, 2019, pp. 9775-9784.

Chen et al., "Multi-view 3d object detection network for autonomous driving," Proceedings of the IEEE Conference on Computer Vision and Pattern Recognition, 2017, pp. 1907-1915.

Deshmukh et al., "Benchmarking human performance for continuous speech recognition," Proceeding of Fourth International Conference on Spoken Language Processing. ICSLP '96, Oct. 1996, 4 pages.

Engelcke et al., "Vote3deep: Fast object detection in 3d point clouds using efficient convolutional neural networks," 2017 IEEE International Conference on Robotics and Automation (ICRA), Jun. 2017, pp. 1355-1361.

Feng et al., "Deep active learning for efficient training of a lidar 3d object detector," 2019 IEEE Intelligent Vehicles Symposium (IV), Jun. 2019, pp. 667-674.

Ge et al., "AFDet: Anchor free one stage 3d object detection," CoRR, Jun. 2020, arxiv.org/abs/2006.12671, 10 pages.

Gu et al., "Hplflownet: Hierarchical permutohedral lattice flownet for scene flow estimation on large-scale point clouds," Proceedings of the IEEE/CVF Conference on Computer Vision and Pattern Recognition, 2019, pp. 3254-3263.

He et al., "Structure aware single-stage 3d object detection from point cloud," Proceedings of the IEEE/CVF Conference on Computer Vision and Pattern Recognition, Jun. 2020, pp. 11873-11882.

Hu et al., "What you see is what you get: Exploiting visibility for 3d," Proceedings of the IEEE/CVF Conference on Computer Vision and Pattern Recognition, 2020, pp. 11001-11009.

Huang et al., "An LSTM approach to temporal 3d object detection in lidar point clouds," European Conference on Computer Vision, Dec. 2020, pp. 266-282.

Iscen et al., "Label propagation for deep semi-supervised learning," Proceedings of the IEEE/CVF Conference on Computer Vision and Pattern Recognition, 2019, pp. 5070-5079.

Krizhevsky et al., "Imagenet classification with deep convolutional neural networks," Commun. ACM, May 2017, 60(6):84-90.

Ku et al., "Joint 3d proposal generation and object detection from view aggregation," 2018 IEEE/RSJ International Conference on Intelligent Robots and Systems (IROS), Oct. 2018, pp. 1-8.

Lang et al., "PointPillars: Fast Encoders for Object Detection from Point Clouds," CoRR, May 2019, arxiv.org/abs/1812.05784, 9 pages.

Lang et al., "Pointpillars: Fast encoders for object detection from point clouds," Proceedings of the IEEE/CVF Conference on Computer Vision and Pattern Recognition, 2019, pp. 12697-12705.

Lee et al., "Leveraging pre-trained 3d object detection models for fast ground truth generation," 2018 21st International Conference on Intelligent Transportation Systems, Nov. 2018, pp. 2504-2510.

Lee, "Pseudo-label: The simple and efficient semi-supervised learning method for deep neural networks," Workshop on challenges in representation learning, 3(2):896.

Li et al., "Joint spatialtemporal optimization for stereo 3D object tracking," Proceedings of the IEEE/CVF Conference on Computer Vision and Pattern Recognition, 2020, pp. 6877-6886.

Li et al., "Vehicle detection from 3D lidar using fully convolutional network," CoRR, Aug. 2016, arxiv.org/abs/1608.07916, 8 pages.

Li, "3D fully convolutional network for vehicle detection in point cloud," 2017 IEEE/RSJ International Conference on Intelligent Robots and Systems (IROS), Sep. 2017, pp. 1513-1518.

Liang et al., "Deep continuous fusion for multi-sensor 3D object detection," Proceedings of the European Conference on Computer Vision, 2018, pp. 641-656.

Liang et al., "Multi-task multi-sensor fusion for 3D object detection," 2019 IEEE/CVF Conference on Computer Vision and Pattern Recognition (CVPR), 2019, pp. 7337-7345.

Ling et al., "Fast interactive object annotation with curve-GCN," Proceedings of the IEEE Conference on Computer Vision and Pattern Recognition, 2019, pp. 5257-5266.

Lippmann, "Speech recognition by machines and humans," Speech Communication, Jul. 1997, 22(1):1-15.

Liu et al., "Flownet3D: Learning scene flow in 3D point clouds," Proceedings of the IEEE Conference on Computer Vision and Pattern Recognition, pp. 529-537, 2019.

Liu et al., "Meteornet: Deep learning on dynamic 3D point cloud sequences," Proceedings of the IEEE International Conference on Computer Vision, 2019, pp. 9246-9255.

Luo et al., "Fast and furious: Real time end-to-end 3d detection, tracking and motion forecasting with a single convolutional net," Proceedings of the IEEE Conference on Computer Vision and Pattern Recognition, Jun. 2018, pp. 3569-3577.

Meng et al., "Weakly supervised 3D object detection from lidar point cloud," CoRR, Jul. 2020, arXiv:2007.11901, 20 pages.

Meyer et al., "LaserNet: An efficient probabilistic 3D object detector for autonomous driving," Proceedings of the IEEE Conference on Computer Vision and Pattern Recognition (CVPR), 2019, pp. 12677-12686.

Meyer et al., "Sensor fusion for joint 3d object detection and semantic segmentation," Proceedings of the IEEE/CVF Conference on Computer Vision and Pattern Recognition, 2019, pp. 1230-1237.

Mittal et al., "Just go with the flow: Self-supervised scene flow estimation," Proceedings of the IEEE/CVF Conference on Computer Vision and Pattern Recognition, 2020, pp. 11177-11185.

Ngiam et al., "Starnet: Targeted computation for object detection in point clouds," CoRR, Dec. 2019, arxiv.org/abs/1908.11069, 12 pages.

Owoyemi et al., "Spatiotemporal learning of dynamic gestures from 3D point cloud data," 2018 IEEE International Conference on Robotics and Automation (ICRA), May 2018, 6 pages.

Prantl et al., "Tranquil clouds: Neural networks for learning temporally coherent features in point clouds," CoRR, Jan. 2020, arXiv:1907.05279, 16 pages.

Qi et al., "Frustum pointnets for 3d object detection from RGB-D data," Proceedings of the IEEE Conference on Computer Vision and Pattern Recognition, 2018, pp. 918-927.

(56) References Cited

OTHER PUBLICATIONS

Qi et al., "ImVoteNet: Boosting 3D object detection in point clouds with image votes," Proceedings of the IEEE/CVF Conference on Computer Vision and Pattern Recognition, 2020, pp. 4404-4413.
Qi et al., "PointNet: Deep learning on point sets for 3D classification and segmentation," Proceedings of the IEEE Conference on Computer Vision and Pattern Recognition, 2017, pp. 652-660.
Ren et al., "Faster r-cnn: Towards real-time object detection with region proposal networks," Advances in Neural Information Processing Systems, 2015, 28:91-99.
Russakovsky et al., "Imagenet large scale visual recognition challenge," International Journal of Computer Vision, Apr. 2015, 115(3):211-252.
Shi et al., "Point-gnn: Graph neural network for 3D object detection in a point cloud," Proceedings of the IEEE/CVF Conference on Computer Vision and Pattern Recognition, Jun. 2020, 9 pages.
Shi et al., "Pointrcnn: 3D object proposal generation and detection from point cloud," Proceedings of the IEEE/CVF Conference on Computer Vision and Pattern Recognition, 2019, pp. 770-779.
Shi et al., "PV-RCNN: Pointvoxel feature set abstraction for 3D object detection," Proceedings of the IEEE/CVF Conference on Computer Vision and Pattern Recognition, 2020, pp. 10529-10538.
Simony et al., "Complex-yolo: an euler-region-proposal for real-time 3D object detection on point clouds," Proceedings of the European Conference on Computer Vision Workshops, 2018, 14 pages.
Sindagi et al., "Mvxnet: Multimodal voxelnet for 3D object detection," 2019 International Conference on Robotics and Automation (ICRA), May 2019, pp. 7276-7282.
Solovyev et al., "Weighted boxes fusion: ensembling boxes for object detection models," CoRR, Feb. 2021, arXiv:1910.13302, 9 pages.
Song et al., "Deep sliding shapes for amodal 3d object detection in rgb-d images," Proceedings of the IEEE Conference on Computer Vision and Pattern Recognition, 2016, pp. 808-816.
Sun et al., "Scalability in perception for autonomous driving: Waymo open dataset," Proceedings of the IEEE/CVF Conference on Computer Vision and Pattern Recognition, 2020, pp. 2446-2454.
Tian et al., "FCOS: Fully convolutional one-stage object detection," Proc. Int. Conf. Computer Vision (ICCV), 2019, pp. 9627-9636.
Wang et al., "Pillar-based object detection for autonomous driving," European Conference on Computer Vision, Nov. 2020, pp. 18-34.
Weng et al., "3D Multi-Object Tracking: A Baseline and New Evaluation Metrics," 2020 IEEE/RSJ International Conference on Intelligent Robots and Systems (IROS), Oct. 2021, 9 pages.
Weng et al., "4d forecasting: Sequential forecasting of 100,000 points," Euro. Conf. Comput. Vis. Worksh, 2020, 3:4 pages.
Weng et al., "A baseline for 3d multiobject tracking," CoRR, Jul. 2020, arXiv:1907.03961, 9 pages.
Weng et al., "Joint 3d tracking and forecasting with graph neural network and diversity sampling," arXiv preprint arXiv:2003.07847, Mar. 2020, 19 pages.
Xie et al., "Self-training with noisy student improves imagenet classification," Proceedings of the IEEE/CVF Conference on Computer Vision and Pattern Recognition, 2020, pp. 10687-10698.
Xu et al., "PointFusion: Deep sensor fusion for 3d bounding box estimation," Proceedings of the IEEE Conference on Computer Vision and Pattern Recognition (CVPR), 2018, pp. 244-253.
Yalniz et al., "Billion-scale semi-supervised learning for image classification," CoRR, May 2019, arXiv:1905.00546, 12 pages.
Yan et al., "SECOND: Sparsely embedded convolutional detection," Sensors, Oct. 2018, 18(10):3337.
Yang et al., "3DSSD: Point-based 3d single stage object detector," Proceedings of the IEEE/CVF Conference on Computer Vision and Pattern Recognition, 2020, pp. 11040-11048.
Yang et al., "Ipod: Intensive point-based object detector for point cloud," CoRR, Dec. 2018, arxiv.org/pdf/1812.05276, 9 pages.
Yang et al., "Pixor: Realtime 3D object detection from point clouds," Proceedings of the IEEE Conference on Computer Vision and Pattern Recognition, 2018, pp. 7652-7660.
Yang, "STD: Sparse-todense 3D object detector for point cloud," 2019 IEEE/CVF International Conference on Computer Vision, 2019, pp. 1951-1960.
Ye et al., "Hvnet: Hybrid voxel network for lidar based 3D object detection," Proceedings of the IEEE/CVF Conference on Computer Vision and Pattern Recognition, 2020, pp. 1628-1637.
Yin et al., "Center-based 3D Object Detection and Tracking," Proceedings of the IEEE/CVF Conference on Computer Vision and Pattern Recognition, 2021, pp. 11784-11793.
Yin et al., "LiDAR-Based online 3D video object detection with graph-based message passing and spatiotemporal transformer attention," Proceedings of the IEEE/CVF Conference on Computer Vision and Pattern Recognition, 2020, pp. 11492-11501.
Zakharov et al., "Autolabeling 3d objects with differentiable rendering of sdf shape priors," Proceedings of the IEEE/CVF Conference on Computer Vision and Pattern Recognition, 2020, pp. 12224-12233.
Zeng et al., "Voting for voting in online point cloud object detection," Robotics: Science and Systems, Jul. 2015, 1(3):10-15.
Zhou et al., "End-to-End Multi-View Fusion for three-dimensional Object Detection in LiDAR Point Clouds," CoRR, Oct. 2019, arXiv:1910.06528, 10 pages.
Zhou et al., "VoxelNet: End-to-end learning for point cloud based 3D object detection," Proceedings of the IEEE Conference on Computer Vision and Pattern Recognition, 2018, pp. 4490-4499.
Zou et al., "Confidence regularized self-training," Proceedings of the IEEE International Conference on Computer Vision, 2019, pp. 5982-5991.

* cited by examiner ured by the network. For example, the one or more sensors can include one or more of: a LIDAR sensor, a RADAR sensor, a

OBJECT-CENTRIC THREE-DIMENSIONAL AUTO LABELING OF POINT CLOUD DATA

CROSS-REFERENCE TO RELATED APPLICATION

This application claims priority to U.S. Provisional Patent Application No. 63/068,966, filed on Aug. 21, 2020, and U.S. Provisional Patent Application No. 63/114,461, filed on Nov. 16, 2020, the disclosures of both of which are hereby incorporated by reference in their entirety.

BACKGROUND

This specification relates to processing sensor data, e.g., laser sensor data, using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with the current values of a respective set of parameters.

SUMMARY

This specification describes methods, computer systems, and apparatus, including computer programs encoded on computer storage media, for processing a sensor data segment that includes a temporal sequence of point clouds to perform object-centric three-dimensional auto labeling on the sensor data segment.

In one innovative aspect, there is described a method for performing three-dimensional auto-labeling on sensor data. The method is implemented by a system including one or more computers. The system obtains a sensor data segment that includes a temporal sequence of three-dimensional point clouds generated from sensor readings of an environment by one or more sensors. Each three-dimensional point cloud includes a respective plurality of points in a first coordinate system. The system identifies, from the sensor data segment, (i) a plurality of object tracks that each corresponds to a different object in the environment and (ii) for each object track, respective initial three-dimensional regions in each of one or more of the point clouds in which the corresponding object appears. Each initial three-dimensional region is an initial estimate of the three-dimensional region of the point cloud that includes points that are measurements of the corresponding object. The system generates, for each object track, extracted object track data that includes at least the points in the respective initial three-dimensional regions for the object track. The system further generates, for each object track and from the extracted object track data for the object track, an auto labeling output that defines respective refined three-dimensional regions in each of the one or more point clouds that is a refined estimate of the three-dimensional region of the point cloud that includes points that are measurements of the corresponding object.

In some implementations, the system processes each of the point clouds in the temporal sequence using an object detector to obtain, for each point cloud, a detector output that identifies a plurality of three-dimensional regions in the point cloud that are predicted to correspond to objects. The system further processes the detector output using an object tracker to obtain an object tracker output that associates each of at least a subset of the three-dimensional regions in each of the point clouds with a respective one of the plurality of object tracks.

In some implementations, the one or more sensors are located on an object in the environment and wherein the first coordinate system is centered at the object in the environment.

In some implementations, the object in the environment is an autonomous vehicle navigating through the environment.

In some implementations, the system extracts, from each of the one or more point clouds in which the corresponding object appears, a plurality of points including the points in the initial three-dimensional region in the point cloud for the object track, and transforms, using frame pose data for each of the one or more point clouds, each of the extracted points to a second coordinate system centered at a stationary location in the environment.

In some implementations, the plurality of points includes the points in the initial three-dimensional region of the point cloud for the object track and additional context points in the vicinity of the three-dimensional region in the point cloud.

In some implementations, the system determines, from the extracted object track data for the object track, whether the object track corresponds to a static object or a dynamic object. In response to determining that the object track corresponds to a static object, the system generates an aggregate representation of the object track that includes extracted points from all of the one or more point clouds in the second coordinate system, and processes the aggregate representation using a static track auto labeling neural network to generate the data defining the refined region.

In some implementations, the system identifies one of the initial three-dimensional regions for the object track, generates, a network input by transforming each of the extracted points from the second coordinate system to a third coordinate system that is centered at a particular point in the identified initial three-dimensional region, and provides the network input as input to the static track auto labeling neural network.

In some implementations, the object detector also outputs a confidence score for each three-dimensional region. The system selects, from the initial three-dimensional regions for the object track, the initial three-dimensional region with the highest confidence score.

In some implementations, the static track auto labeling neural network outputs data identifying a three-dimensional region in the third coordinate system. When generating the data defining the refined region, the system transforms the data identifying the three-dimensional region into the second coordinate system.

In some implementations, in response to determining that the object track corresponds to a dynamic object, the system generates, for each of the one or more point clouds in which the corresponding object appears, a respective representation of the object track from the extracted point from the point cloud; and processes the respective representations using a dynamic track auto labeling neural network to generate, for each of the one or more point clouds in which the corresponding object appears, data defining the respective refined region in the point cloud.

In some implementations, the system transforms each of the extracted points from the point cloud from the second coordinate system to a respective fourth coordinate system that is centered at a particular point in the initial three-dimensional region in the point cloud for the object track.

In some implementations, each respective representation also includes data specifying the initial three-dimensional region in the point cloud for the object track.

In some implementations, for each of the one or more point clouds in which the corresponding object appears, the dynamic track auto labeling neural network outputs data identifying a three-dimensional region in the respective fourth coordinate system. When generating the data defining the refined region, the system transforms the data identifying the three-dimensional region from the respective fourth coordinate system to the second coordinate system.

There is also provided a system including one or more computers and one or more storage devices storing instructions that when executed by the one or more computers cause the one or more computers to perform the method described above.

There is also provided one or more computer storage media storing instructions that when executed by one or more computers, cause the one or more computers to perform the method described above.

The subject matter described in this specification can be implemented in particular embodiments so as to realize one or more of the following advantages.

Generating high-quality three-dimensional object labels from sensor data is a difficult task. Most existing techniques use a frame-centric approach by detecting objects on inputs including one or more frames of sensor data. These approaches suffer from challenges including a lack of complementary and context information from object motions, and/or difficulties for scaling up to more than a few frames. As a result, the existing techniques do not provide adequately accurate three-dimensional object labels in an efficient manner.

The techniques described in this specification can be used to automatically generate high-quality three-dimensional object labels from sensor data. In particular, in contrast with the traditional frame-based approaches, the described techniques use an object-centric approach that effectively leverages the complementary information on the geometry of an object from different viewpoints in a temporal sequence of sensor measurements. The described system and methods provide improved accuracy for labeling both static and dynamic objects in a scene. The high-quality object labels generated using the described technique can be used for any of a variety of purposes, e.g., to be used as training data for training machine learning models, to generate user interface presentations that show users the positions of objects surrounding the autonomous vehicle or that allow the predictions made by the auto labeling process to be easily verified or refined by users, and so on.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes methods, computer systems, and apparatus, including computer programs encoded on computer storage media, for processing a sensor data segment that includes a temporal sequence of point clouds to perform object-centric three-dimensional auto labeling on the sensor data segment.

Figure 1A:
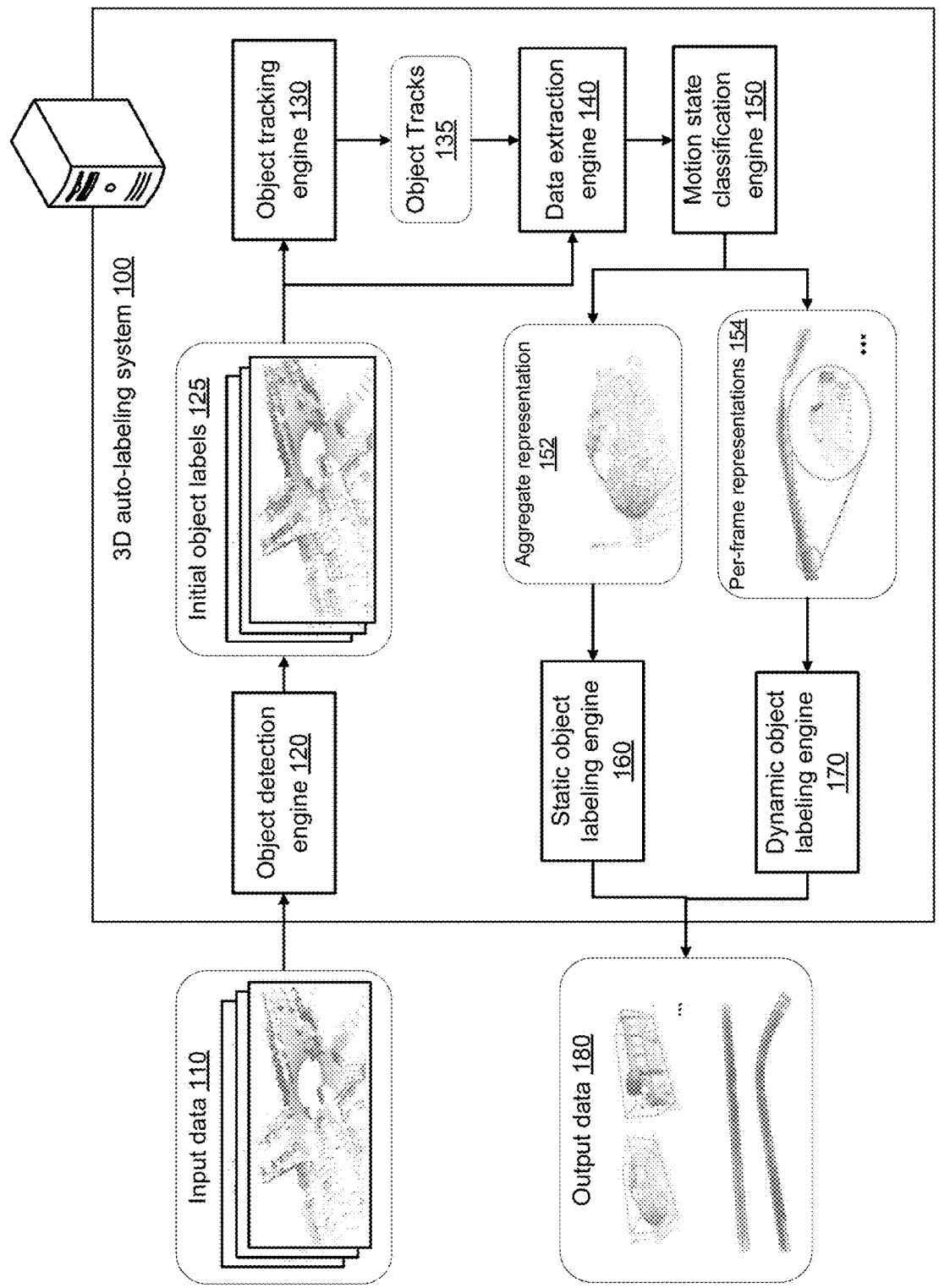
FIG. 1A shows an example three-dimensional (3D) auto-labeling system.

FIG. 1A shows an example of a three-dimensional (3D) auto-labeling system 100. The system 100 is an example of a system implemented as computer programs on one or more computers in one or more locations, in which the systems, components, and techniques described below can be implemented.

In general, the system 100 processes a sensor data segment that includes a temporal sequence of point clouds to "auto label" the sensor data segment with three-dimensional object labels.

In this specification, a three-dimensional object label is defined as a label that identifies a three-dimensional region that corresponds to an object. In some implementations, the three-dimensional object label can be a three-dimensional bounding box indicating the position and geometry of the object. In some implementations, the three-dimensional object label can be a three-dimensional region indicated by individual contours or a three-dimensional distribution of key points that indicate the position and geometry of the object.

In this specification, auto labeling the sensor data segment refers to automatically, i.e., from only the point cloud data and without any manual user involvement, identifying three-dimensional regions, e.g., three-dimensional boxes or regions made up of individual contours, in the point clouds that correspond to objects, i.e., such that any given point that is within the region is a measurement of the same object.

More specifically, the system 100 performs object-centric three-dimensional auto labeling by identifying object tracks that each corresponds to a different object and then identifying, for each object track, regions in the point clouds that are associated with that object track, i.e., such that all of the regions that are associated with a given object track correspond to the object that is associated with the given object track.

In other words, the output of the system is, for each of multiple object tracks, a respective set of three-dimensional regions that track the corresponding object across the time period covered by the sensor data segment.

In contrast with the traditional frame-based approaches, the system 100 uses an object-centric approach that effectively leverages the complementary information on the geometry of an object from different viewpoints in a temporal sequence of sensor measurements. This approach provides improved accuracy for labeling both static and dynamic objects in a scene. The high-quality object labels generated using the described technique can be used for any of a variety of purposes, e.g., to be used as training data for training machine learning models, to generate user interface presentations that show users the positions of objects surrounding the autonomous vehicle or that allow the predictions made by the auto labeling process to be easily verified or refined by users, and so on. In one example, the object labels generated by the system 100 can be used for training a machine-learning model onboard an autonomous vehicle for performing real-time detection of objects from sensor data to ensure safe driving. The onboard machine-learning model can be trained based on a loss function computed on the high-quality labels using any appropriate backpropagation-based machine-learning techniques.

The system 100 obtains a sensor data segment as input data 110. The sensor segment includes a temporal sequence of three-dimensional point clouds. Each point cloud in the temporal sequence includes multiple points that represent a sensor measurement of a scene in an environment captured by one or more sensors. For example, the one or more sensors can be sensors, e.g., Lidar sensors or other sensors that are considered to detect reflections of laser light, of an autonomous vehicle, e.g., a land, air, or sea vehicle, and the scene can be a scene that is in the vicinity of the autonomous vehicle, i.e., that is within range of the sensor(s) of the autonomous vehicles. The sequence is referred to as a temporal sequence because the point clouds are arranged according to the order in which the corresponding sensor measurements were generated.

More specifically, a laser sensor or other sensor can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in angle, azimuth, or both. Sweeping in azimuth, for example, can allow a sensor to detect multiple objects along the same line of sight.

The sensor data segment includes multiple point clouds, each corresponding to a specific time window and including points that represent reflections of pulses of light transmitted by the sensor within that specific time window. Each point can identify the location of the point in a coordinate system that is centered around an object on which the one or more sensors are located, e.g., an autonomous vehicle, and, optionally, additional features of the point, e.g., intensity, second return, and so on.

In some implementations, the respective plurality of points of each three-dimensional point cloud in the sensor data are in a first coordinate system. For example, when the one or more sensors are located on an object in the environment, e.g., on an autonomous vehicle navigating through the environment, the first coordinate system is centered at the object in the environment. That is, the first coordinate system is a sensor-based coordinate system.

In some implementations, the input data 110 can further include sensor pose data for each point cloud. The sensor pose data indicate the positions and orientations of the sensor(s) that collect the point cloud.

In one example, the sensor data segment includes a sequence of point clouds $\{\mathcal{P}_i \in \mathbb{R}^{n_i \times C}\}$, i=1, 2, N with the point cloud $\mathcal{P}_i$ ($n_i$ points with C channels for each point) of each of the N total frames.

The point channels can include the XYZ coordinates in the first coordinate system (i.e., the sensor-based coordinate system) at each frame. The point channels can include other optional information such as intensity, pulse elongation, secondary returns, and color. The input data 110 can also include sensor poses $\{\mathcal{M}_i = [R_i | t_i] \in \mathbb{R}^{3 \times 4}\}$, i=1, 2, N at each frame in a second coordinate system, i.e., a world coordinate system that centers on a stationary point in the environment, so that the motion of the sensors can be compensated in subsequent processing.

The system 100 includes an object detection engine 120 and an object tracking engine 130 for identifying, from the sensor data segment, (i) a plurality of object tracks that each corresponds to a different object in the environment and (ii) for each object track, respective initial three-dimensional regions in each of one or more of the point clouds in which the corresponding object appears. Each initial three-dimensional region is an initial estimate of the three-dimensional region of the point cloud that includes points that are measurements of the corresponding object. For example, an initial three-dimensional region can be a three-dimensional bounding box that indicates the presence, position, and geometry of an object, e.g., a vehicle, detected from the frame. The object tracks and initial object labels are the basis for subsequent object-centric processing.

The object detection engine 120 performs initial object detection on the sensor data segment to generate initial object labels 125. Concretely, the object detection engine 120 processes each of the point clouds in the temporal sequence using an object detector to obtain, for each point cloud, a detector output that identifies a plurality of three-dimensional regions in the point cloud that are predicted to correspond to objects. In some implementations, the object detector also outputs a confidence score for each three-dimensional region. The confidence score indicates a likelihood of an object being present at the predicted position and the certainty of the predicted geometry (e.g., the size and orientation direction) of the object.

In some implementations, a three-dimensional region outputted by the object detection engine 120 can be defined by a three-dimensional bounding box parameterized by its center, size, and orientation. The output can further include respective class types (e.g. vehicles, pedestrians, cyclists) of the detected objects.

The object detection engine 120 can use any appropriate three-dimensional object detector to generate the initial object labels 125. For example, in some implementations, the object detection engine 120 can use a fast point cloud encoder, as detailed in "PointPillars: Fast Encoders for Object Detection from Point Clouds" Lang et al. in arXiv: 1812.05784 [cs.CV] to generate the initial object labels. In another example, the object detection engine 120 can use a 3D voxel Convolutional Neural Network (CNN) with PointNet-based set abstraction, as detailed in "PV-RCNN: Point-Voxel Feature Set Abstraction for 3D Object Detection" Shi et al. in arXiv: 1912.13192 [cs.CV] to generate the initial object labels. In another example, the object detection engine 120 can use a 3D voxel Convolutional Neural Network (CNN) with PointNet-based set abstraction, as detailed in "PV-RCNN: Point-Voxel Feature Set Abstraction for 3D Object Detection" Shi et al. in arXiv: 1912.13192 [cs.CV] to generate the initial object labels.

In some implementations, the object detection engine 120 adopts a Multi-View Fusion (MVF) detector as the object detector to perform the initial object detection from the sensor data segment including a sequence of point clouds. An example of the MVF detector is described in more detail in "End-to-End Multi-View Fusion for three-dimensional Object Detection in LiDAR Point Clouds" Zhou et al. in arXiv: 1910.06528 [cs.CV]. Briefly, the system generates a dynamic voxel representation that assigns a variable number of three-dimensional points in a point cloud to each voxel in the view. The MVF detector processes a network input based on the dynamic voxel representations using a neural network to generate a network output, e.g., an object detection output. The MVF detector adopts a multi-view fusion neural network architecture that can encode point features with more discriminative context information extracted from the different views, e.g., a birds-eye view and a perspective view, resulting in more accurate predictions being generated by the task neural network.

In some implementations, the object detector used for performing the initial object detection is an enhanced MVF detector with one or more enhancements over the original MVF detector. For example, for training the MVF detector, an auxiliary loss can be added for the three-dimensional semantic segmentation, where points are labeled as positives/negatives if they lie inside/outside of a ground truth three-dimensional box. This enhanced the discriminative ability of point-level features.

In another example, in order to obtain more accurate training targets and improve training efficiency, the anchor matching step in the original MVF detector can be removed. Instead, an anchor-free approach can be used.

In another example, the network architecture of the MVF detector can be expanded to increase the model capacity. For example, different from the original MVF detector that uses one ResNet layer in obtaining each down-sampled feature map, the depth of the convolutional sub-networks can be increased by applying one additional ResNet block in each down-sampling branch.

In some implementations, the object detector used for performing the initial object detection is a multi-frame enhanced MVF detector that is extended to use multiple point clouds. Concretely, the object detection engine 120 can extend each point in the point clouds by one additional channel that includes the encoding of the relative temporal offset. The object detection engine 120 then uses the aggregated point cloud as the input to the enhanced MVF detector.

In some implementations, the object detector can be trained on data including three-dimensional point clouds and corresponding ground-truth labels, e.g., ground-truth three-dimensional bounding boxes. Data augmentation can be used for training, e.g., by applying rotation, scaling, and/or flipping along an axis, to the point clouds and ground truth boxes. The object detector can be trained based on a loss function computed on the training examples using any appropriate backpropagation-based machine-learning technique, e.g., using the Adam or AdaGrad optimizers.

In one particular example, the loss function for training the object detector can be defined as $L=L_{cls}+w_1 L_{centerness}+w_2 L_{reg}+w_3 L_{seg}$. The term $L_{cls}$ is the focal loss representing a loss with respect to foreground and background differentiation. The term $L_{centerness}$ is the center-ness loss representing losses with respect to the normalized distance from locations of the object to the center of the object. The term $L_{reg}$ represents a Smooth L1 loss for regressing x, y, z center locations, length, width, height and orientation at foreground pixels. $L_{seg}$ is the auxiliary three-dimensional segmentation loss for distinguishing foreground from background points (points are labeled as foreground/background if they lie inside/outside of a ground truth 3-dimensional box). The weight coefficients $w_1$, $w_2$, and $w_3$ can be selected according to the application. In this implementation, the confidence score can be calculated as the classification score with respect to the term $L_{cls}$.

The object tracking engine 130 performs object tracking based on the initial object labels 125. The object tracking links each respective detected object across multiple frames. Concretely, the object tracking engine 130 processes the initial object labels 125 using an object tracker to obtain an object tracker output 135 that associates each of at least a subset of the three-dimensional regions in each of the point clouds with a respective one of the plurality of object tracks. For example, the object tracking engine 130 can assign an object ID to each of the initial three-dimensional regions in the initial object labels 125, where the same object across different frames is assigned with the same object ID.

In a particular example, before performing object tracking, the object tracking engine 130 transforms the initial three-dimensional regions generated by the object detection engine 120 from the sensor coordinate system to the world coordinate system to reduce the impact of sensor ego-motion in tracking. The object tracking engine 130 further removes all initial object labels with confidence scores less than a threshold (e.g., 0.1).

Then the object tracking engine 130 uses an object tracker to perform the object tracking. The object tracking engine 130 can use any appropriate object tracker to perform the object tracking. One example of the object tracker is detailed in "3D Multi-Object Tracking: A Baseline and New Evaluation Metrics" Weng et al. in arXiv: 1907.03961 [cs.CV]. Another example of the object tracker is detailed in "Center-based 3D Object Detection and Tracking" Yin et al. in arXiv: 2006.11275 [cs.CV].

The system 100 further includes a data extraction engine 140 that generates extracted track data 145 for each object track. The extracted object track data 145 for each object track includes at least the points in the respective initial three-dimensional regions for the object track. In other words, the extracted track data includes a sequence of object point clouds $\{\mathcal{P}_{j,k}\}$, $k \in S_j$ for each object j and its visible frames $S_j$, where each object point cloud includes at least the points in the respective initial three-dimensional region for the object track j from the frame k.

In some implementations, the data extraction engine 140 further transforms, using frame pose data for each point cloud, each of the extracted points to a second coordinate system (i.e., the world coordinate system) that is centered at a stationary location.

In some implementations, for each initial three-dimensional region, the extracted track data includes both the points in the initial three-dimensional region of the point cloud for the object track and additional context points in the vicinity of the three-dimensional region in the point cloud.

In a particular example, for each unique object (e.g., according to the object ID), the data extraction engine 140 crops the points in the three-dimensional point clouds within a three-dimensional region based on the predicted bounding box in the initial object labels. The three-dimensional region can be the predicted bounding box enlarged by a predetermined amount in each direction to include more context.

The system 100 generates refined three-dimensional object labels as output data 180 for each object track. The refined three-dimensional object labels are object labels with improved quality compared to the initial object labels 125. For example, the refined three-dimensional object labels can be associated with higher object detection accuracy, e.g., greater Intersection over Union (IoU) metric, compared to the initial object labels 125. The refined three-dimensional object labels can further provide improved accuracy for object classification, e.g., more accurate classification labels for detected objects such as vehicles and pedestrians.

Concretely, the system 100 generates, for each object track and from the extracted object track data for the object track, an auto labeling output that defines respective refined three-dimensional regions in each of the one or more point clouds. The refined three-dimensional region for a given point cloud is a refined estimate of the three-dimensional region of the given point cloud that includes points that are measurements of the corresponding object.

In one example, for each frame of point clouds, the system outputs a three-dimensional bounding box that defines the three-dimensional region for each of the objects that appear in the frame. The three-dimensional bounding box can be parameterized by its center, size, and orientation. The labeling output can further include respective class types (e.g. vehicles, pedestrians, cyclists) and unique object IDs for the bounding boxes of the objects that appear in the frame.

Certain objects characterized by the object tracks can be static during the time period of the sensor data sequence. For example, parked cars or a vehicle stopped at a stoplight may not move during the time period. In certain applications, it is preferred to assign a single three-dimensional bounding box to a static object that represents the static position of the object during the time period rather than assigning separate boxes in different frames to avoid jittering of the output bounding boxes over time. In general, the system 100 can use a strategy that handles static and moving objects differently, by outputting data defining a single refined region in the environment for a static object, and outputting data defining the respective refined region for each frame for a dynamic (i.e., moving) object.

In particular, the system 100 includes a motion state classification engine 150 that determines, for each object track, whether the object track corresponds to a static object or a dynamic object based on the extracted object track data outputted by the data extraction engine 140.

In some implementations, an object is defined as static only if it is stationary in the entire sequence.

In a particular example, the motion state classification engine 150 processes the extracted object track data for the object track using a linear classifier to generate a classification result that estimates whether the object is static or dynamic. In particular, the motion state classification engine 150 can extract one or more features from the extracted object data and fit the features to a linear classifier to estimate the motion state. The features can be heuristic features, including, e.g., the variance of the centers of the initial three-dimensional bounding boxes, and the begin-to-end distance between the initial three-dimensional bounding boxes (i.e., the distance from the center of the bounding box first appearing in the sequence and the center of the bounding box last appearing in the sequence), with all bounding boxes being in the world coordinate system.

If it is determined that the object track corresponds to a static object, the system 100 uses a static object labeling engine 160 to process an aggregate representation 152 of the object track. The aggregate representation 152 includes extracted points from all of the one or more point clouds in the second coordinate system.

In a particular example, the static object labeling engine 160 processes the aggregate representation 152 using a static track auto labeling neural network to generate the data defining the refined region as the output data 180.

In some implementations, before processing the aggregate representation 152 using the static track auto labeling neural network, the static object labeling engine 160 performs an alignment transformation to transform the extracted points in the point cloud from the world coordinate system to a coordinate system specific to an initial three-dimensional label. This transformation improves alignments of the point clouds across different frames according to the track data, and benefits the subsequent processing. Concretely, the static object labeling engine 160 identifies one of the initial three-dimensional regions for object track as a reference for coordinate alignment. For example, the static object labeling engine 160 can select the initial three-dimensional region with the highest confidence score from the initial three-dimensional regions for the object track, and uses the selected initial three-dimensional region as the identified initial three-dimensional region. The static object labeling engine 160 then generates a network input by transforming each of the extracted points from the second coordinate system to a third coordinate system that is centered at a particular point in the identified initial three-dimensional region, and provides the network input as the input to the static track auto labeling neural network.

In some implementations, the static track auto labeling neural network outputs data identifying a three-dimensional region in the third coordinate system, and the static object labeling engine 160 can further transform the data identifying the three-dimensional region into the second coordinate system, i.e., the world coordinate system.

A particular example of the static labeling engine, including the network architecture of the static track auto labeling neural network, is described in detail with reference to FIG. 1B.

If the motion state classification engine 150 determines that the object track corresponds to a dynamic object, the system 100 uses a dynamic object labeling engine 170 to generate a respective representation 154 of the object track for each point cloud. Concretely, the dynamic object labeling engine 170 generates, for each of the one or more point clouds (in the one or more frames) in which the corresponding object appears, a respective representation of the object track from the extracted points from the point cloud.

In some implementations, to generate the respective per-frame representations of the object track, the dynamic object labeling engine 170 transforms each of the extracted points from the point cloud from the second coordinate system (i.e., the world coordinate system) to a respective fourth coordinate system that is centered at a particular point in the initial three-dimensional region in the point cloud for the object track. That is, the system transforms the extracted points in the point cloud from the world coordinate system to a coordinate system that centers at and optionally aligned with one of the initial three-dimensional regions. This transformation aligns the point clouds across different frames according to the track data. In some implementations, each respective representation also includes data specifying the initial three-dimensional region in the point cloud for the object track.

The dynamic object labeling engine 170 generates refined three-dimensional object labels as output data 180 for the object track using a dynamic labeling model. In particular, the dynamic object labeling engine 170 processes the respective representations using a dynamic track auto labeling neural network to generate, for each of the one or more point clouds in which the corresponding object appears, data defining the respective refined region in the point cloud.

In some implementations, for each of the one or more point clouds in which the corresponding object appears, the dynamic track auto labeling neural network outputs data that identifies a three-dimensional region in the respective fourth coordinate system (the label-specific coordinate system). And the dynamic object labeling engine 170 further transforms the data identifying the three-dimensional region from the respective fourth coordinate system to the second coordinate system, i.e., the world coordinates.

A particular example of the dynamic object labeling engine, including the network architecture of the dynamic track auto labeling neural network, is described in detail with reference to FIG. 1C.

Figure 1B:
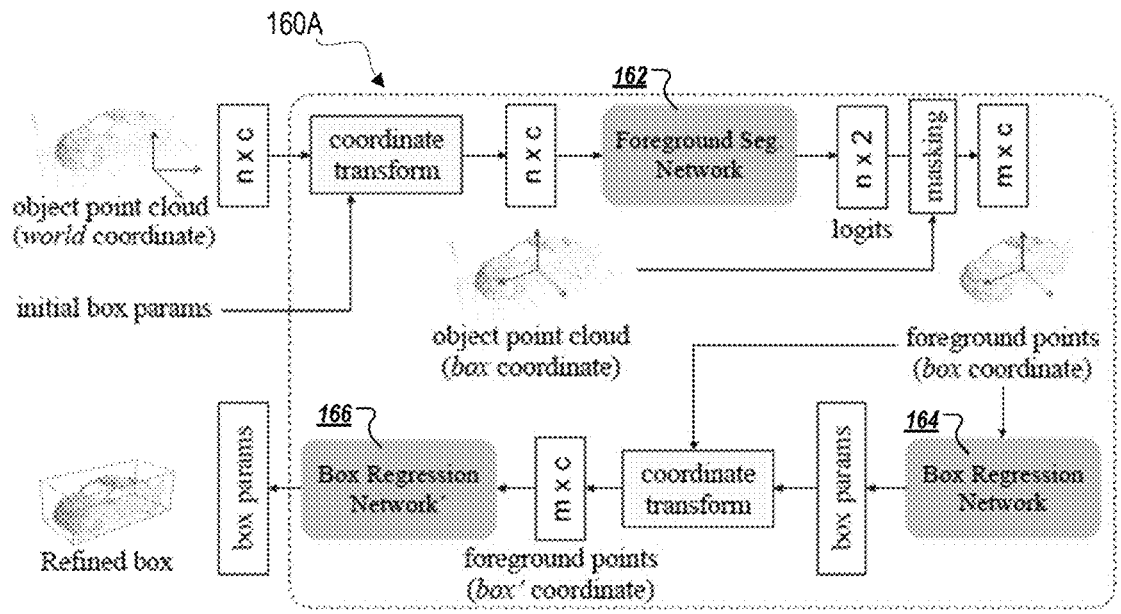
FIG. 1B shows an example static object labeling engine.

FIG. 1B shows an example static object labeling engine 160A for labeling a static object. For convenience, the labeling engine 160A will be described as being implemented by a system of one or more computers located in one or more locations. For example, a three-dimensional auto-labeling system, e.g., the three-dimensional auto-labeling system 100 of FIG. 1A, appropriately programmed in accordance with this specification, can implement the labeling engine 160A. The static object labeling engine 160A can be a particular example of the static object labeling engine 160 of the system 100.

In general for a static object, the static object labeling engine 160A processes the aggregated point clouds ($\mathcal{P}_j = \cup \{\mathcal{P}_{j,k}\}$ in the world coordinate system) from points at different frames and predicts a single three-dimensional bounding box. The static object labeling engine 160A then transforms the three-dimensional bounding box to each frame-based coordinate system based on the known sensor poses for each frame.

In particular, the static object labeling engine 160 first transforms (e.g., via rotation and translation) the object points for the object track in each point cloud to a box-specific coordinate system with reference to an initial three-dimensional bounding box selected from the track data, such that the point clouds are more aligned for the object. For example, the engine 160 can select the initial three-dimensional bounding box with the highest confidence score for the box-specific coordinate system.

In the box-specific coordinate system, the +X axis is the orientation direction of the selected initial bounding box, and the origin is the center of the box.

The static object labeling engine 160A processes the object points using a foreground segmentation network 162 to segment the foreground points of the object from the background. The static object labeling engine 160A further processes the object foreground points using a first box regression network 164 and a second regression network 166 to generate a regressed representation for a refined three-dimensional bounding box.

In general, the foreground segmentation network 162 is a neural network that processes a set of points to assign a respective foreground score for each point that represents a likelihood of the point belonging to the region corresponding to the object (i.e., being in the foreground with regard to the object).

In a particular example, the foreground segmentation network 162 is a PointNet segmentation network that includes a first per-point multi-layer perceptron (MLP) that generates a feature embedding for each input point, respective batch normalization and ReLU layers for each layer of the first MLP, a max-pooling layer for pooling the feature embeddings generated from the first MLP, a second MLP for processing an input that concatenates the max-pooled feature embedding with the output of the 2nd layer of the first per-point MLP to output a predicted foreground logit score for each input point. The static object labeling engine uses the predicted foreground logits to extract the predicted foreground points.

In general, the first box regression network 164 is a neural network that regresses a set of points to parameters of a bounding box.

In a particular example, the first box regression network 164 is a variant of the PointNet that processes the foreground points and outputs predicted three-dimensional bounding box parameters. Concretely, the first box regression network 164 includes a first per-point MLP to generate a feature embedding for each input point, a max-pooling layer, and a second MLP for processing the max pooled feature embeddings, and a final linear layer that outputs the predicted three-dimensional bounding box parameters, including, e.g., a center position regression, an orientation angle regression (e.g., a classification into each of a plurality of orientation angle bins), and a box size regression (e.g., a classification into each of a plurality of template sizes).

The static object labeling engine 160A can apply the second box regression network 166 on the foreground points transformed to a box-specific coordination system with reference to the predicted three-dimensional bounding box indicating the output from the box regression network 164. The second box regression network 166 can have the same architecture as the first box regression network 164.

In some implementations, the second box regression network 166 can share network weights with the first box regression network 164. That is, the same neural network is used to iteratively process the predicted foreground points. In some other implementations, the static object labeling engine 160A can cascade the two box regression networks 164 and 166 without sharing the weights.

The networks 162, 164, and 166 can be trained on segmentation masks and ground truth three-dimensional bounding boxes. The network 162 predicts two scores for each point as foreground or background and can be trained on a cross-entropy loss $L_{seg}$. The box regression networks 164 and 166 each regress the bounding box by predicting its center cx, cy, cz, its size classes (e.g., among a few pre-defined template size classes) and residual sizes for each size class, as well as the orientation angle bin class and a residual orientation angle for each bin. In a particular example, the static object labeling engine 160A can use 12 orientation bins (with each bin accounting for 30°) and 3 size clusters for vehicles: (4.8, 1.8, 1.5), (10.0, 2.6, 3.2), (2.0, 1.0, 1.6), where the dimensions are length, width, height. The box regression loss can be defined as $L_{box_i} = L_{c-reg_i} + w_1 L_{s-cls_i} + w_2 L_{s-reg_i} + w_3 L_{h-cls_i} + w_4 L_{h-reg_i}$ where $i \in \{1,2\}$ represents the cascade/iterative box estimation step. The total box regression loss is $= L_{seg} + w(L_{box_1} + L_{box_2})$. The $w_i$ and w are hyper-parameter weights of the losses.

Figure 1C:
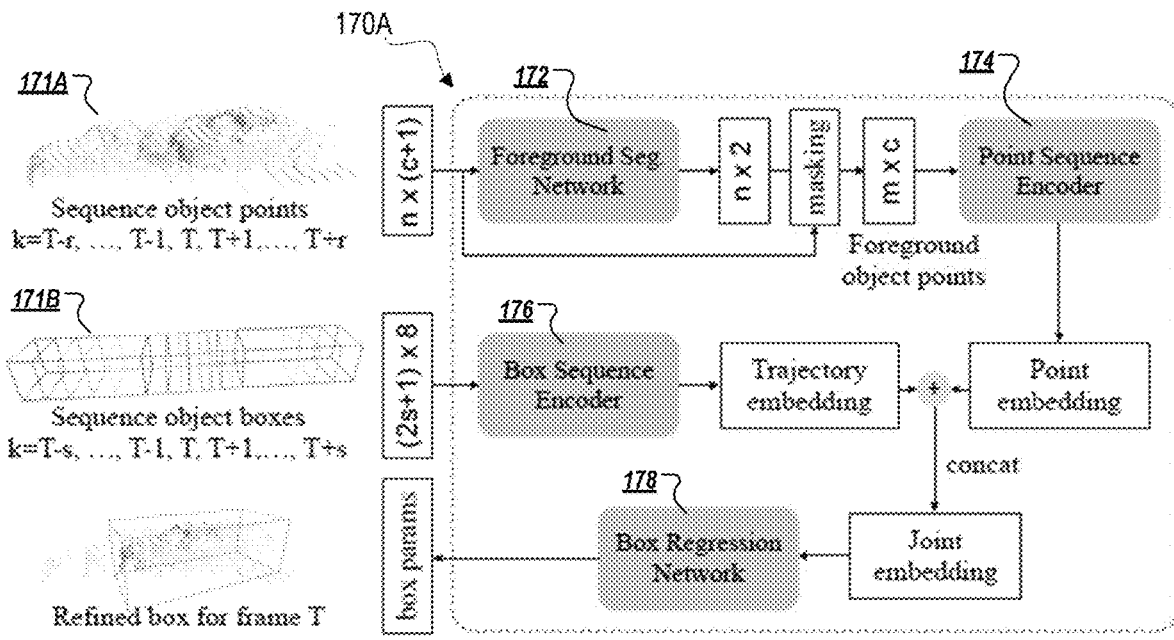
FIG. 1C shows an example dynamic object labeling engine.

FIG. 1C shows an example labeling engine 170A for labeling a dynamic object. For convenience, the labeling engine 170A will be described as being implemented by a system of one or more computers located in one or more locations. For example, a three-dimensional auto-labeling system, e.g., the three-dimensional auto-labeling system 100 of FIG. 1A, appropriately programmed in accordance with this specification, can implement the labeling engine 170A. The labeling engine 170A can be a particular example of the dynamic object labeling engine 170 of the system 100.

For a moving object, the dynamic object labeling engine 170A predicts different three-dimensional refined bounding boxes for each frame. The particular example dynamic object labeling engine 170A leverages both the point cloud and the sequence of initial bounding boxes.

Given a sequence of object point clouds $\{\mathcal{P}_{j,k}\}$ and a sequence of initial bounding boxes $\{\mathcal{B}_{j,k}\}$ for the object j at frames $k \in S_j$, the dynamic object labeling engine 170A predicts the refined bounding boxes at each frame k. The dynamic object labeling engine 170 includes two branches, one processing the sequence of extracted object point clouds 171A and the other processing the sequence of initial bounding boxes 171B.

For the point cloud branch 171A, the dynamic object labeling engine 170 processes a sub-sequence of the sequence of the object point clouds. The sub-sequence of object point clouds is centered on the frame T, and can be represented by $\{\mathcal{P}_{j,k}\}_{k=T-r}^{T+r}$. After adding a temporal encoding channel to each point, the sub-sequence of object points are merged through union and transformed to the box coordinate of the initial bounding box $\mathcal{B}_{j,T}$ at the center frame of the sub-sequence. The dynamic object labeling engine includes a foreground segmentation network 172 for classifying the foreground points (of the 2r+1 frames) and a point sequence encoder network 174 for encoding object points into an embedding. The inference is repeated on every frame T of the sequence of the object point clouds. r is the context size of the input frame sequence. It can be selected by cross validation-hyperparameter tuning on a validation dataset.

For the box sequence branch 171B, a sub-sequence of the initial bounding boxes $\{\mathcal{B}_{j,k}\}_{k=T-s}^{T+s}$ of 2s+1 frames are transformed to the box coordinate of the initial box at frame T. Note that the box sub-sequence can be longer than the point sub-sequence to capture the longer trajectory shape. The dynamic object labeling engine includes a box sequence encoder network 176 for encoding the initial box sub-sequence into a trajectory embedding.

The dynamic object labeling engine 170A concatenates the computed object embedding and the trajectory embedding to form a joint embedding, and uses a box regression network 178 to predict the refined bounding box at frame T.

The networks 172, 174, 176, and 178 can adopt any suitable network architecture. For example, the foreground segmentation network 172 can adopt a PointNet architecture. The point sequence encoder network 164 is a PointNet-like architecture with a per-point MLP, a max-pooling layer, and another MLP to process the max-pooled features. The box sequence encoder network 176 can be a PointNet, a convolutional network, or a graph neural network that processes parameters (in the center frame's box coordinate), including, e.g., box center (cx, cy, cz), box size (length, width, height), box orientation 0, and a temporal encoding. The box regression network 178 can be an MLP including a linear layer to regress the refined box parameters.

The networks 172, 174, 176, and 178 can be trained on a loss that includes a segmentation loss and a box regression loss. The box regression outputs can be defined in the same way as that for the static object labeling engine 160A with reference to FIG. 1B. For pedestrians, a single size cluster can be used, e.g., (0.9, 0.9, 1.7) of length, width, and height. The final loss is $L=L_{seg}+v_1 L_{box\text{-}traj}+v_2 L_{box\text{-}obj\text{-}pc}+v_3 L_{box}$ where there are three box losses from the trajectory starting frame, the object point cloud starting frame, and the joint staring respectively. The parameters $v_1$, $v_2$, $v_3$, the weights for the loss terms to achieve balanced learning of the three types of embeddings.

Figure 2A:
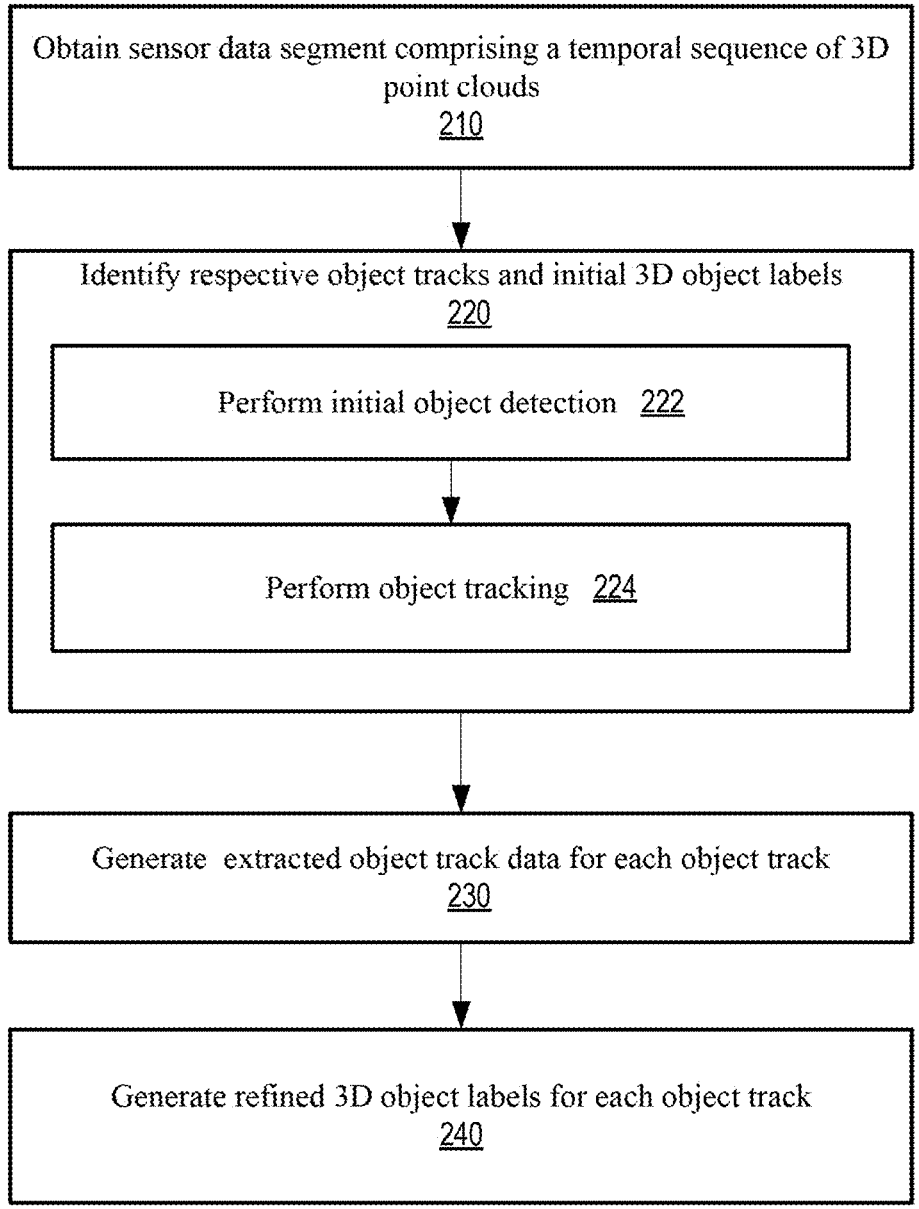
FIG. 2A is a flow diagram illustrating an example process for auto-labeling three-dimensional point cloud data.

FIG. 2A is a flow diagram illustrating an example process 200 for processing a sensor data segment to perform object-centric three-dimensional auto labeling on the sensor data segment. For convenience, the process 200 will be described as being performed by a system of one or more computers located in one or more locations. For example, a three-dimensional auto-labeling system, e.g., the three-dimensional auto-labeling system 100 of FIG. 1A, appropriately programmed in accordance with this specification, can perform the process 200 to perform auto-labeling on the sensor data.

In step 210, the system obtains a sensor data segment as input data. The sensor data segment includes a temporal sequence of three-dimensional point clouds. Each point cloud in the temporal sequence includes multiple points that represent a sensor measurement of a scene in an environment captured by one or more sensors. For example, the one or more sensors can be sensors, e.g., Lidar sensors or other sensors that are considered to detect reflections of laser light, of an autonomous vehicle, e.g., a land, air, or sea vehicle, and the scene can be a scene that is in the vicinity of the autonomous vehicle. The sequence is referred to as a temporal sequence because the point clouds are arranged according to the order in which the corresponding sensor measurements were generated.

In some implementations, the respective plurality of points of each three-dimensional point cloud in the sensor data are in a first coordinate system. For example, when the one or more sensors are located on an object in the environment, e.g., on an autonomous vehicle navigating through the environment, the first coordinate system is centered at the object in the environment. That is, the first coordinate system is a sensor-based coordinate system. The input data can further include sensor pose data for each point cloud. The sensor pose data indicate the positions and orientations of the sensors that collect the point cloud.

In step 220, the system identifies object tracks and initial three-dimensional object labels from the sensor data segment.

Specifically, in step 220, the system identifies (i) a plurality of object tracks that each corresponds to a different object in the environment and (ii) for each object track, respective initial three-dimensional regions in each of one or more of the point clouds in which the corresponding object appears. Each initial three-dimensional region is an initial estimate of the three-dimensional region of the point cloud that includes points that are measurements of the corresponding object.

In some implementations, step 220 can include processes 222 and 224.

In the process 222, the system performs initial object detection on the sensor data segment. Concretely, the system processes each of the point clouds in the temporal sequence using an object detector to obtain, for each point cloud, a detector output that identifies a plurality of three-dimensional regions in the point cloud that are predicted to correspond to objects. In some implementations, the object detector also outputs a confidence score for each three-dimensional region. The confidence score indicates a likelihood of an object being present at the predicted position and the certainty of the predicted geometry (e.g., the size and orientation direction) of the object.

In some implementations, a three-dimensional region outputted by the object detector can be defined by a three-dimensional bounding box parameterized by its center, size, and orientation. The output can further include respective class types (e.g. vehicles, pedestrians, cyclists) of the detected objects.

In the process 224, the system performs object tracking based on the output from the process 222. The object tracking links each respective detected object across multiple frames. Concretely, the system processes the detector output using an object tracker to obtain an object tracker output that associates each of at least a subset of the three-dimensional regions in each of the point clouds with a respective one of the plurality of object tracks. For example, the system can assign an object ID to each of the three-dimensional regions identified in process 222, where the same object across different frames is assigned with the same object ID.

In step 230, the system generates extracted track data for each object track. The extracted object track data includes at least the points in the respective initial three-dimensional regions for the object track.

In some implementations, the system further transforms, using frame pose data for each point cloud, each of the extracted points to a second coordinate system centered at a stationary location, also known as the world coordinate system, in the environment.

In some implementations, for each initial three-dimensional region, extracted track data includes both the points in the initial three-dimensional region of the point cloud for the object track and additional context points in the vicinity of the three-dimensional region in the point cloud.

In step 240, the system generates refined three-dimensional object labels for each object track. Concretely, the system generates, for each object track and from the extracted object track data for the object track, an auto labeling output that defines respective refined three-dimensional regions in each of the one or more point clouds that is a refined estimate of the three-dimensional region of the point cloud that includes points that are measurements of the corresponding object.

In one example, for each frame of point clouds, the system outputs a three-dimensional bounding box that defines the three-dimensional region for each of the objects that appear in the frame. The three-dimensional bounding box can be parameterized by its center, size, and orientation. The labeling output can further include respective class types (e.g. vehicles, pedestrians, cyclists) and unique object IDs for the bounding boxes of the objects that appear in the frame.

An example process for generating the refined three-dimensional object labels is described in detail with reference to FIG. 2B.

Figure 2B:
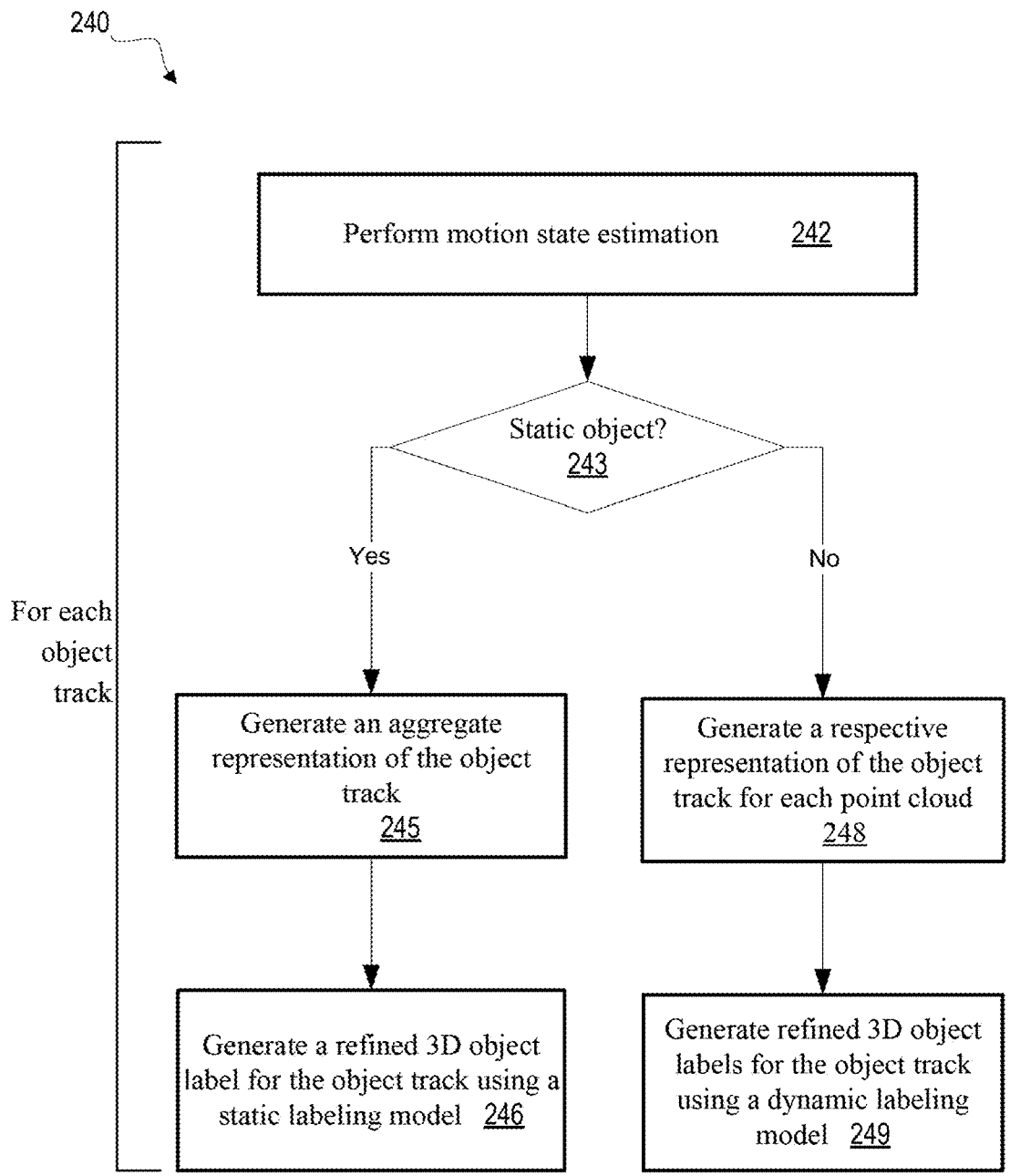
FIG. 2B is a flow diagram illustrating an example process for labeling an object based on object track data.

FIG. 2B is a flow diagram illustrating an example process 240 for generating refined three-dimensional object labels for an object track. For convenience, the process 240 will be described as being performed by a system of one or more computers located in one or more locations. For example, a three-dimensional auto-labeling system, e.g., the three-dimensional auto-labeling system 100 of FIG. 1A, appropriately programmed in accordance with this specification, can perform the process 240 to label an object based on object track data.

Certain objects characterized by the object tracks can be static during the time period of the sensor data sequence. For example, parked cars or a vehicle stopped at a stoplight may not move during the time period. In certain applications, it is preferred to assign a single three-dimensional bounding box to a static object rather than separate boxes in different frames to avoid jittering of the output bounding boxes over time. In general, the process 240 uses a strategy that handles static and moving objects differently, by outputting data defining a single refined region in the environment for a static object, and outputting data defining the respective refined region for each frame for a dynamic (i.e., moving) object.

In step 242, the system performs object motion state estimation. Concretely, the system determines, from the extracted object track data for the object track, whether the object track corresponds to a static object or a dynamic object.

In step 243, if it is determined that the object track corresponds to a static object, the system proceeds to perform steps 245 and 246. If it is determined that the object track corresponds to a dynamic object, the system proceeds to perform steps 248 and 249.

In step 245, in response to determining that the object track corresponds to a static object, the system generates an aggregate representation of the object track. The aggregate representation includes extracted points from all of the one or more point clouds in the second coordinate system.

In step 246, the system generates a refined three-dimensional object label for the object track using a static labeling model. In particular, the system processes the aggregate representation using a static track auto-labeling neural network to generate the data defining the refined region.

In some implementations, the system identifies one of the initial three-dimensional regions for object track as a reference for coordinate alignment. For example, the system can select the initial three-dimensional region with the highest confidence score from the initial three-dimensional regions for the object track, and uses the selected initial three-dimensional region as the identified initial three-dimensional region. The system then generates a network input by transforming each of the extracted points from the second coordinate system to a third coordinate system that is centered at a particular point in the identified initial three-dimensional region, and provides the network input as the input to the static track auto labeling neural network. That is, the system transforms the extracted points in the point cloud from the world coordinate system to a coordinate system specific to an initial three-dimensional label. This transformation improves alignments of the point clouds across different frames according to the track data, and benefits the subsequent processing.

In some implementations, the static track auto labeling neural network outputs data identifying a three-dimensional region in the third coordinate system, and the system further transforms the data identifying the three-dimensional region into the second coordinate system, i.e., the world coordinate system.

A particular example of the static track auto labeling neural network is described in detail with reference to FIG. 1B.

In step 248, in response to determining that the object track corresponds to a dynamic object, the system generates a respective representation of the object track for each point cloud. Concretely, the system generates, for each of the one or more point clouds in which the corresponding object appears, a respective representation of the object track from the extracted point from the point cloud.

In some implementations, the system transforms each of the extracted points from the point cloud from the second coordinate system (i.e., the world coordinate system) to a respective fourth coordinate system that is centered at a particular point in the initial three-dimensional region in the point cloud for the object track. That is, the system transforms the extracted points in the point cloud from the world coordinate system to a coordinate system specific to an initial three-dimensional label. This transformation improves alignments of the point clouds across different frames according to the track data, and benefits the subsequent processing.

In some implementations, each respective representation also includes data specifying the initial three-dimensional region in the point cloud for the object track.

In step 249, the system generates refined three-dimensional object labels for the object track using a dynamic labeling model. Concretely, the system processes the respective representations using a dynamic track auto labeling neural network to generate, for each of the one or more point clouds in which the corresponding object appears, data defining the respective refined region in the point cloud.

In some implementations, for each of the one or more point clouds in which the corresponding object appears, the dynamic track auto labeling neural network outputs data identifying a three-dimensional region in the respective fourth coordinate system. And the system further transforms the data identifying the three-dimensional region from the respective fourth coordinate system to the second coordinate system, i.e., the world coordinates.

A particular example of the dynamic labeling model is described in detail with reference to FIG. 1C.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field-programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other units suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification, the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special-purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory, or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto-optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of the message to a personal device, e.g., a smartphone that is running a messaging application and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship between client and server arises by virtue of computer programs running on the respective computers and having a client-server relationship with each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially be claimed as such, one or more features from a claimed combination can in some cases be excised from the combination, and the claimed combination may be directed to a sub-combination or variation of a sub-combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated into a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
    obtaining a sensor data segment comprising a temporal sequence of three-dimensional point clouds generated from sensor readings of an environment by one or more sensors, each three-dimensional point cloud comprising a respective plurality of points in a first coordinate system;
    identifying, from the sensor data segment, (i) a plurality of object tracks that each corresponds to a different object in the environment and (ii) for each object track, respective initial three-dimensional regions in each of one or more of the point clouds in which the corresponding object appears, wherein each initial three-dimensional region is an initial estimate of the three-dimensional region of the point cloud that includes points that are measurements of the corresponding object, wherein the identifying comprises:
        processing each of the point clouds in the temporal sequence using an object detector to obtain, for each point cloud, a detector output that identifies a plurality of three-dimensional regions in the point cloud that are predicted to correspond to objects; and
        processing the detector output using an object tracker to obtain an object tracker output that associates each of at least a subset of the three-dimensional regions in each of the point clouds with a respective one of the plurality of object tracks;
    generating, for each object track, extracted object track data that includes at least the points in the respective initial three-dimensional regions for the object track; and
    generating, for each object track and from the extracted object track data for the object track, an auto labeling output that defines respective refined three-dimensional regions in each of the one or more point clouds that is a refined estimate of the three-dimensional region of the point cloud that includes points that are measurements of the corresponding object.

2. The method of claim 1, wherein the one or more sensors are located on an object in the environment and wherein the first coordinate system is centered at the object in the environment.

3. The method of claim 2, wherein the object in the environment is an autonomous vehicle navigating through the environment.

4. The method of claim 2, wherein generating, for each object track, extracted object track data that includes at least the points in the initial three-dimensional regions for the object track comprises:
- extracting, from each of the one or more point clouds in which the corresponding object appears, a plurality of points including the points in the initial three-dimensional region in the point cloud for the object track; and
- transforming, using frame pose data for each of the one or more point clouds, each of the extracted points to a second coordinate system centered at a stationary location in the environment.

5. The method of claim 4, wherein the plurality of points includes the points in the initial three-dimensional region of the point cloud for the object track and additional context points in a vicinity of the three-dimensional region in the point cloud.

6. The method of claim 4, wherein generating, for each object track and from the extracted object track data for the object track, data defining a respective refined three-dimensional region in the point cloud that is a refined estimate of the three-dimensional region of the point cloud that includes points that are measurements of the corresponding object comprises:
- determining, from the extracted object track data for the object track, whether the object track corresponds to a static object or a dynamic object.

7. The method of claim 6, wherein generating, for each object track and from the extracted object track data for the object track, data defining a respective refined three-dimensional region in the point cloud that is a refined estimate of the three-dimensional region of the point cloud that includes points that are measurements of the corresponding object further comprises:
- in response to determining that the object track corresponds to a static object:
- generating an aggregate representation of the object track that includes extracted points from all of the one or more point clouds in the second coordinate system; and
- processing the aggregate representation using a static track auto labeling neural network to generate the data defining the refined region.

8. The method of claim 7, wherein processing the aggregate representation using a static track auto labeling neural network to generate the data defining the refined region comprises:
- identifying one of the initial three-dimensional regions for the object track;
- generating a network input by transforming each of the extracted points from the second coordinate system to a third coordinate system that is centered at a particular point in the identified initial three-dimensional region; and
- providing the network input as input to the static track auto labeling neural network.

9. The method of claim 8, wherein the object detector also outputs a confidence score for each three-dimensional region and wherein identifying one of the initial three-dimensional regions for the object track comprises selecting, from the initial three-dimensional regions for the object track, the initial three-dimensional region with a highest confidence score.

10. The method of claim 8, wherein the static track auto labeling neural network outputs data identifying a three-dimensional region in the third coordinate system, and wherein generating the data defining the refined region comprises transforming the data identifying the three-dimensional region into the second coordinate system.

11. The method of claim 6, wherein generating, for each object track and from the extracted object track data for the object track, data defining a refined region in the point cloud that is a refined estimate of a region of the point cloud that corresponds to the object track further comprises:
- in response to determining that the object track corresponds to a dynamic object:
- generating, for each of the one or more point clouds in which the corresponding object appears, a respective representation of the object track from the extracted point from the point cloud; and
- processing the respective representations using a dynamic track auto labeling neural network to generate, for each of the one or more point clouds in which the corresponding object appears, data defining the respective refined region in the point cloud.

12. The method of claim 11, wherein generating, for each of the one or more point clouds in which the corresponding object appears, a respective representation of the object track comprises:
- transforming each of the extracted points from the point cloud from the second coordinate system to a respective fourth coordinate system that is centered at a particular point in the initial three-dimensional region in the point cloud for the object track.

13. The method of claim 12, wherein, for each of the one or more point clouds in which the corresponding object appears, the dynamic track auto labeling neural network outputs data identifying a three-dimensional region in the respective fourth coordinate system, and wherein generating the data defining the refined region comprises transforming the data identifying the three-dimensional region from the respective fourth coordinate system to the second coordinate system.

14. The method of claim 11, wherein each respective representation also includes data specifying the initial three-dimensional region in the point cloud for the object track.

15. A system comprising one or more computers and one or more storage devices storing instructions that when executed by the one or more computers cause the one or more computers to perform:
- identifying, from the sensor data segment, (i) a plurality of object tracks that each corresponds to a different object in the environment and (ii) for each object track, respective initial three-dimensional regions in each of one or more of the point clouds in which the corresponding object appears, wherein each initial three-dimensional region is an initial estimate of the three-dimensional region of the point cloud that includes points that are measurements of the corresponding object, wherein the identifying comprises:
  - processing each of the point clouds in the temporal sequence using an object detector to obtain, for each point cloud, a detector output that identifies a plurality of three-dimensional regions in the point cloud that are predicted to correspond to objects; and
  - processing the detector output using an object tracker to obtain an object tracker output that associates each of at least a subset of the three-dimensional regions in each of the point clouds with a respective one of the plurality of object tracks;
- generating, for each object track, extracted object track data that includes at least the points in the respective initial three-dimensional regions for the object track; and generating, for each object track and from the extracted object track data for the object track, an auto labeling output that defines respective refined three-dimensional regions in each of the one or more point clouds that is a refined estimate of the three-dimensional region of the point cloud that includes points that are measurements of the corresponding object.

16. The system of claim 15, wherein the one or more sensors are located on an object in the environment and wherein the first coordinate system is centered at the object in the environment.

17. One or more non-transitory computer storage media storing instructions that when executed by one or more computers cause the one or more computers to perform:

identifying, from the sensor data segment, (i) a plurality of object tracks that each corresponds to a different object in the environment and (ii) for each object track, respective initial three-dimensional regions in each of one or more of the point clouds in which the corresponding object appears, wherein each initial three-dimensional region is an initial estimate of the three-dimensional region of the point cloud that includes points that are measurements of the corresponding object, wherein the identifying comprises:

processing each of the point clouds in the temporal sequence using an object detector to obtain, for each point cloud, a detector output that identifies a plurality of three-dimensional regions in the point cloud that are predicted to correspond to objects; and processing the detector output using an object tracker to obtain an object tracker output that associates each of at least a subset of the three-dimensional regions in each of the point clouds with a respective one of the plurality of object tracks;

generating, for each object track, extracted object track data that includes at least the points in the respective initial three-dimensional regions for the object track; and generating, for each object track and from the extracted object track data for the object track, an auto labeling output that defines respective refined three-dimensional regions in each of the one or more point clouds that is a refined estimate of the three-dimensional region of the point cloud that includes points that are measurements of the corresponding object.

* * * * *